(12) United States Patent
Ko

(10) Patent No.: US 8,201,669 B2
(45) Date of Patent: Jun. 19, 2012

(54) AMPLITUDE SENSITIVE DAMPER APPARATUS

(75) Inventor: Suk Jin Ko, Gwacheon (KR)

(73) Assignee: Hyundai Motor Company, Seoul (KR)

( * ) Notice: Subject to any disclaimer, the term of this patent is extended or adjusted under 35 U.S.C. 154(b) by 409 days.

(21) Appl. No.: 12/489,251

(22) Filed: Jun. 22, 2009

(65) Prior Publication Data

US 2010/0078276 A1 Apr. 1, 2010

(30) Foreign Application Priority Data

Sep. 29, 2008 (KR) ........................ 10-2008-0095524

(51) Int. Cl.
*F16F 9/50* (2006.01)

(52) U.S. Cl. ................. 188/280; 188/282.8; 188/322.15

(58) Field of Classification Search .................. 188/280, 188/281, 282.1, 282.5, 282.8, 283, 322.13, 188/322.15, 322.22

See application file for complete search history.

(56) References Cited

U.S. PATENT DOCUMENTS

| | | | | |
|---|---|---|---|---|
| 2,911,072 | A * | 11/1959 | Becker et al. ................. | 188/315 |
| 4,503,951 | A * | 3/1985 | Imaizumi ...................... | 188/280 |
| 5,823,306 | A * | 10/1998 | de Molina ................. | 188/322.15 |
| 6,651,787 | B2 * | 11/2003 | Grundei ........................ | 188/280 |
| 7,073,642 | B2 * | 7/2006 | Keller et al. ................ | 188/282.5 |
| 7,172,058 | B2 * | 2/2007 | Burkert et al. ................. | 188/315 |
| 7,201,260 | B2 * | 4/2007 | Diederich et al. ........ | 188/322.15 |
| 7,431,135 | B2 * | 10/2008 | Vanbrabant ................ | 188/282.5 |
| 7,743,895 | B2 * | 6/2010 | Krawczyk .................. | 188/282.8 |
| 8,113,324 | B2 * | 2/2012 | Baalmann et al. ........ | 188/322.15 |
| 2003/0051957 | A1 * | 3/2003 | Lemieux .................. | 188/322.15 |
| 2005/0133319 | A1 * | 6/2005 | Wilhelm ........................ | 188/281 |
| 2005/0230202 | A1 * | 10/2005 | Nevoigt et al. ........... | 188/322.13 |
| 2006/0118372 | A1 * | 6/2006 | Hammer et al. .............. | 188/284 |

* cited by examiner

*Primary Examiner* — Bradley King
*Assistant Examiner* — Thomas Irvin
(74) *Attorney, Agent, or Firm* — Morgan, Lewis & Bockius LLP

(57) ABSTRACT

An amplitude sensitive damper apparatus that is provided with an amplitude sensitive valve unit may include a plug coupled to a piston rod to form a spring groove with the piston rod in a predetermined section, a spool member configured and dimensioned to cover the spring groove and slidably coupled to the piston rod to move up and down along the piston rod, wherein the spool member includes a supporting portion that protrudes toward the piston rod from a middle portion of an inner surface of the spool member, upper and lower elastic members that are mounted inside the spring groove to support the supporting portion of the spool member upwards and downwards respectively along the piston rod, and an amplitude sensitive valve that is integrally mounted on an outer surface of the spool member to generate a damping force when the spool member is moving.

14 Claims, 5 Drawing Sheets

AMPLITUDE SENSITIVE DAMPER APPARATUS

CROSS-REFERENCE TO RELATED APPLICATION

The present application claims priority to Korean Patent Application Number 10-2008-0095524 filed on Sep. 29, 2008, the entire contents of which application is incorporated herein for all purposes by this reference.

BACKGROUND OF THE INVENTION

1. Field of the Invention

The present invention relates to an amplitude sensitive damper apparatus, and more particularly to an amplitude sensitive damper apparatus that varies a damping force characteristic according to a wheel stroke (amplitude) size of a vehicle.

2. Description of Related Art

Generally, a damper absorbs a repellent force of a spring to improve the close contacting property between a tire and the road and to reduce the rolling of the vehicle body so that driving safety of the vehicle can be enhanced.

Then, if the damping force is much higher than the repellent force of the spring, there is a problem in which the damper restricts the elastic deformation of the spring such that the spring does not normally operate.

FIG. 1 is a cross-sectional view of general amplitude sensitive damper apparatus.

As shown in FIG. 1, an outer case 101 and an inner case 103 are provided, operating oil is charged therein, and a piston rod 105 and a piston valve 107 that is mounted thereon are installed inside the inner case 103 to move up and down while generating a damping force through the operating oil.

The piston valve 107 divides the inner case 103 into upper and lower oil chambers C1 and C2, and a fixed piston valve 109 is provided in the lower portion of the inner case 103 to compensate the volume variation.

Further, an amplitude sensitive valve unit 111 is constituted on the piston rod 105 in the upper side of the piston valve 107 to vary the damping force characteristic according to the wheel stroke size of the vehicle such that ride comfort and handling stability can be improved.

Upper and lower retainers 113 and 115 are mounted on the upper and lower sides of the piston valve 107, an amplitude sensitive valve 117 is slidably mounted on the piston rod 105 between the upper and lower retainers 113 and 115, and the upper end and the lower end thereof are respectively supported by inner and outer springs S1 and S2.

Here, if the movement of the piston rod has a high amplitude, the amplitude sensitive valve 117 generates a high damping force, and if the movement thereof has a low amplitude, the amplitude sensitive valve 117 generates a low damping force.

However, when the piston rod swings with the high amplitude, there is a drawback in that impact noise is generated between the retainer 113 and the amplitude sensitive valve 117, and the inner and outer springs S1 and S2 are applied in the upper and lower portions of the amplitude sensitive valve 117 such that the overall weight and the production cost are increased.

Also, the inner and outer springs S1 and S2 are applied in the upper portion and the lower portion of the amplitude sensitive valve 117 such that there is a problem in that the overall length of the amplitude sensitive valve unit 111 becomes longer.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an amplitude sensitive damper apparatus that reduces impact noise that is generated at an amplitude sensitive valve and that has an improved structure to be light and compact.

In an aspect of the present invention, an amplitude sensitive damper apparatus that is provided with an amplitude sensitive valve unit to vary a damping force characteristic according to a wheel stroke size of a vehicle, may include a plug coupled to a piston rod to form a spring groove with the piston rod in a predetermined section, a spool member configured and dimensioned to cover the spring groove and slidably coupled to the piston rod to move up and down along the piston rod, wherein the spool member includes a supporting portion that protrudes toward the piston rod from a middle portion of an inner surface of the spool member, upper and lower elastic members that are mounted inside the spring groove to support the supporting portion of the spool member upwards and downwards respectively along the piston rod, and an amplitude sensitive valve that is integrally mounted on an outer surface of the spool member to generate a damping force when the spool member is moving, wherein the amplitude sensitive valve includes an orifice and wherein the plug is monolithically formed on the piston rod.

In another aspect of the present invention, the amplitude sensitive valve unit may further include a stopper portion configured to restrict a vertical direction movement of the spool member within a predetermined distance, wherein the stopper portion includes upper and lower slanted surfaces that are respectively formed on an upper outer surface and a lower outer surface of the spring groove on a slant against the vertical movement direction of the spool member, and upper and lower corresponding slanted surfaces that are formed on a slant substantially corresponding to the upper and lower slanted surfaces of the spring groove from upper and lower side surfaces of the supporting portion to upper and lower end portions of the spool member respectively.

An upper end portion of the upper elastic member may be supported by an upper side surface of the spring groove of the piston rod, and a lower end portion thereof may be supported by an upper side surface of the supporting portion of the spool member, wherein the upper end portion of the upper elastic member is retained in a receiving groove formed in the upper side surface of the spring groove.

An upper end portion of the lower elastic member may be supported by a lower side surface of the supporting portion of the spool member, and a lower end portion thereof may be supported by a lower side surface of the spring groove, wherein the lower end portion of the lower elastic member is retained in a receiving groove formed in the lower side surface of the spring groove.

A piston valve may be mounted on the piston rod, and the amplitude sensitive damper apparatus is mounted on upper or lower portion of the piston valve, wherein the plug is mounted on the upper portion of the piston valve.

The spring groove may be formed between a groove formed on an outer surface of the piston rod and an end surface of the plug coupled to the piston rod, wherein the spool member is formed corresponding to an exterior circumference of the piston rod, and the spring groove is continuously formed corresponding to an interior circumference of the spool member and wherein the supporting portion is continuously formed along an interior circumference of the spool member.

In further another aspect of the present invention, the upper slanted surface may be formed corresponding to a circumference of the piston rod, the lower slanted surface may be formed corresponding to a circumference of the plug, and the upper corresponding slanted surface and the lower corresponding slanted surface are formed respectively corresponding to the upper slanted surface and the lower slanted surface.

Further, since the corresponding slanted surfaces are formed respectively on the spool member and the piston rod, the impact noise that is generated between the spool member and the piston rod can be reduced when the stroke size (swing amplitude) of the piston is large (high).

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
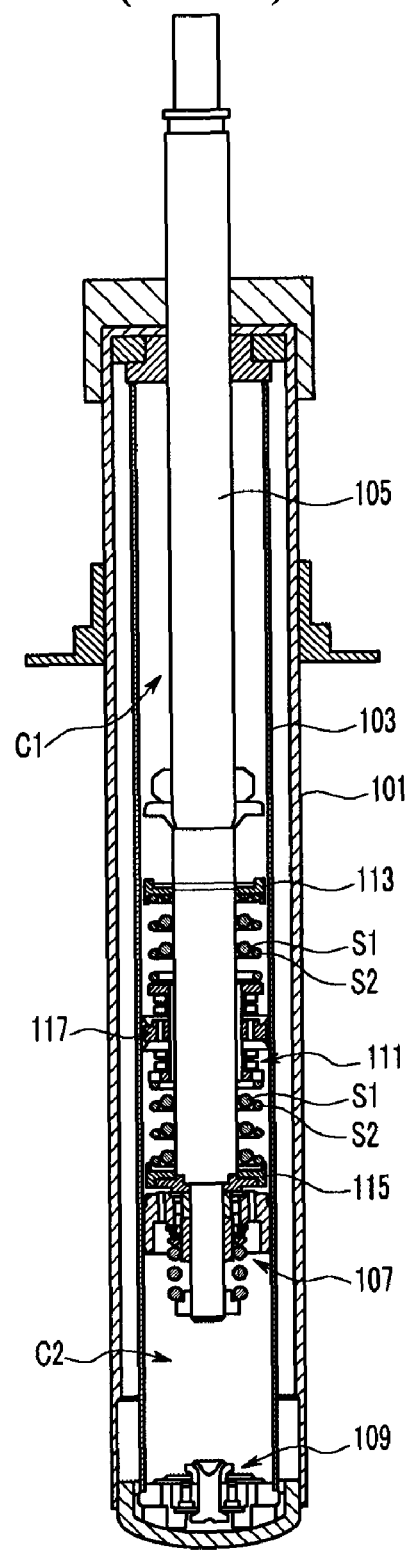
FIG. 1 is a cross-sectional view of general amplitude sensitive damper apparatus.
Figure 2:
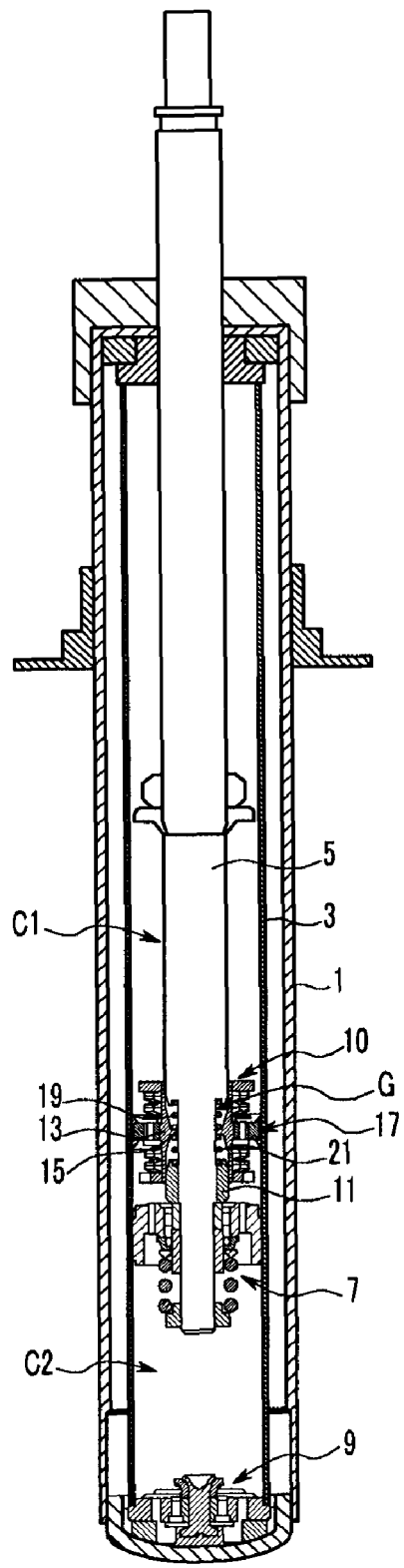
FIG. 2 is a cross-sectional view of an exemplary amplitude sensitive damper apparatus according to the present invention.
Figure 3:
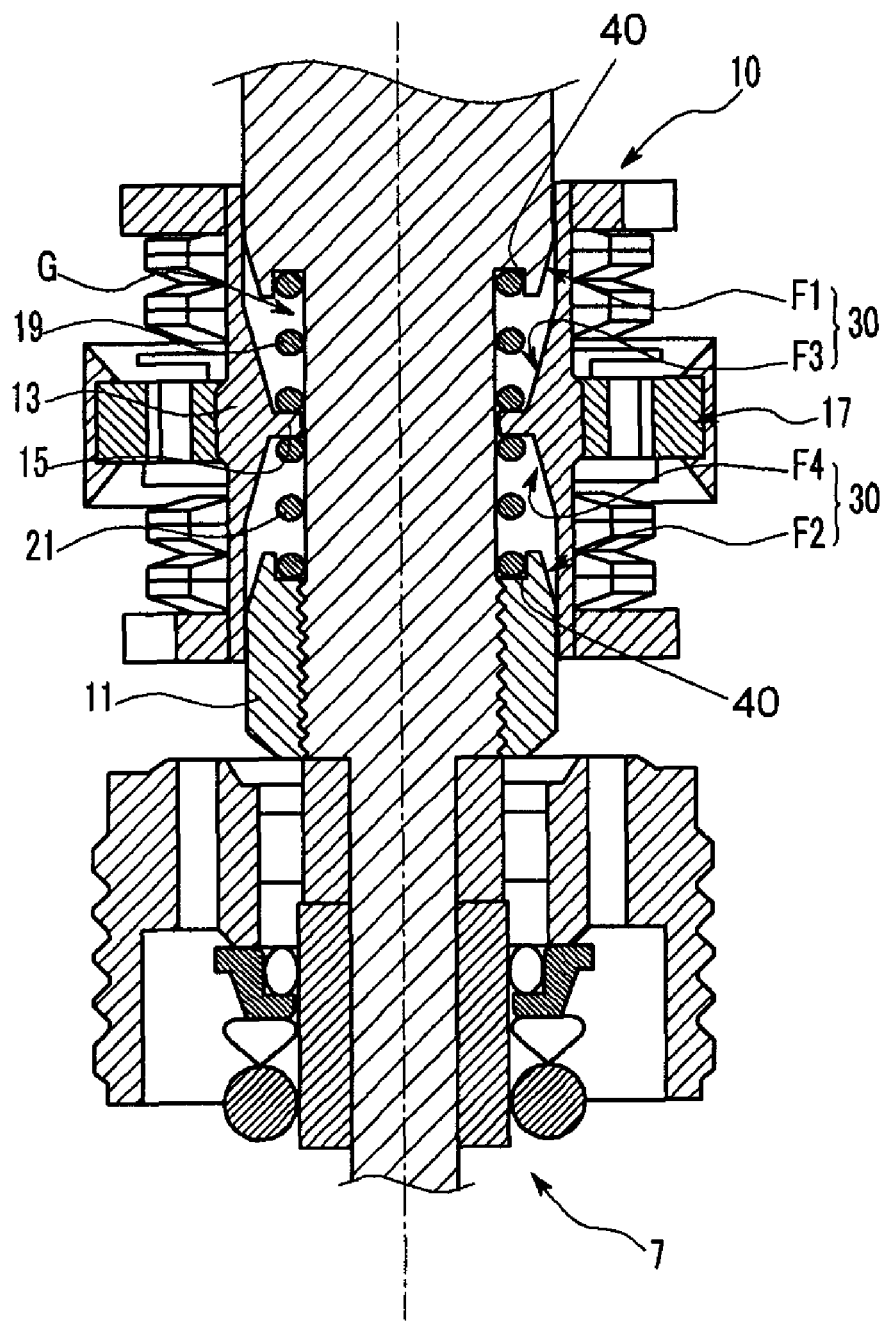
FIG. 3 is an expanded cross-sectional view of an exemplary amplitude sensitive valve unit that is applied in an amplitude sensitive damper apparatus according to the present invention.

FIG. 2 is a cross-sectional view of an amplitude sensitive damper apparatus according various embodiments of the present invention, and FIG. 3 is an expanded cross-sectional view of an amplitude sensitive valve unit that is applied in an amplitude sensitive damper apparatus according to various embodiments of the present invention.

As shown in FIG. 2, an amplitude sensitive damper apparatus includes an outer case 1 and an inner case 3 that are filled with operating oil.

A piston rod 5 is disposed inside the inner case 3 to be connected to the vehicle body, and a piston valve 7 is mounted on the piston rod to generate a damping force when it is moved up and down through the operating oil.

The piston valve 7 divides the inner case 3 into upper and lower oil chambers C1 and C2, and a fixed piston valve 9 is mounted in the lower portion of the inner case 3 to compensate a volume variation.

Further, the amplitude sensitive valve unit 10 is disposed in the upper side of the piston valve 7 on the piston rod 5, and it varies the damping force characteristic according to the wheel stroke size of the vehicle to simultaneously improve the ride comfort and the handling stability thereof.

As shown FIG. 3, a plug 11, which is screw-coupled to the lower portion of the piston rod 5, that is, the upper side of the piston valve 7, forms a spring groove (G) with the piston rod 5 in a predetermined section of the amplitude sensitive valve unit 10 according to various embodiments.

A groove is formed in the circumference direction on the outer surface of the piston rod 5 of the upper side of the piston valve 7, and the spring groove (G) is formed between the groove and one end surface of the plug 11 that is screw coupled to the piston rod 5. In addition, a spool member 13 is disposed so that the piston rod 5 and the plug 11 are inserted therethrough, the spool member has a cylindrical shape, and a supporting portion 15 is formed in the circumference direction of the middle of the interior surface to be disposed inside the spring groove (G).

The spool member 13 is firstly mounted to cover the spring groove (G) before the plug 11 is coupled, to move up and down on the piston rod 5 and the plug 11.

In various embodiments of the present invention, the plug 11 is monolithically formed on the piston rod 5.

An amplitude sensitive valve 17 is integrally formed on the exterior circumference of the spool member 13, and it moves up and down with the spool member 13 based on the piston rod 5 to vary the damping force characteristic according to the wheel stroke size of the vehicle.

Further, upper and lower sensitive springs 19 and 21 are mounted inside the spring groove (G) to support the upper portion and the lower portion of a supporting portion 15 of the spool member 13.

Here, it is desirable for the upper sensitive spring 19 to have a coil spring structure in which the upper end thereof is supported by the upper side surface of the spring groove (G) of the piston rod 5 and the lower end thereof is supported by the upper side surface of the supporting portion 15 of the spool member 13.

Also, it is desirable for the lower sensitive spring 21 to have a coil spring structure in which the upper end thereof is supported by the lower side surface of the supporting portion 15 of the spool member 13 and the lower end is supported by the lower side surface of the spring groove (G) at the plug 11.

In various embodiments of the present invention, the piston rod 5 and the plug 11 may include receiving grooves 40 to retain upper and lower end portions of the upper and lower sensitive springs 19 and 21 therein as shown in FIG. 3.

Meanwhile, a stopper portion 30 is formed between the spring groove (G) and the interior circumference of the spool member 13 corresponding thereto so as to reduce the impact noise when the amplitude sensitive valve 17 operates and so as to restrict the up and down movement of the spool member 13.

As shown in FIG. 3, the stopper portion 30 includes an upper slanted surface F1 and a lower slanted surface F2 that are respectively formed in the upper exterior circumference of the spring groove (G) at the piston rod 5 and in the lower exterior circumference of the spring groove (G) at the plug 11.

Also, an upper corresponding slanted surface F3 and an lower corresponding slanted surface F4, which are slanted from the upper side surface and the lower side surface of the supporting portion 15 of the spool member 13 to the interior circumference of the spool member 13, are formed, and the upper corresponding slanted surface F3 and the lower corresponding slanted surface F4 are formed to respectively correspond to the upper slanted surface F1 and lower slanted surface F2.

More specifically, the upper slanted surface and the lower slanted surface F1 and F2 are formed to become closer to the center portion of the spring groove, and the upper corresponding slanted surface and the lower corresponding slanted surface F3 and F4 are formed to become farther from the upper surface and the lower surface of the supporting portion towards the end edge of the spool member.

Figure 4:
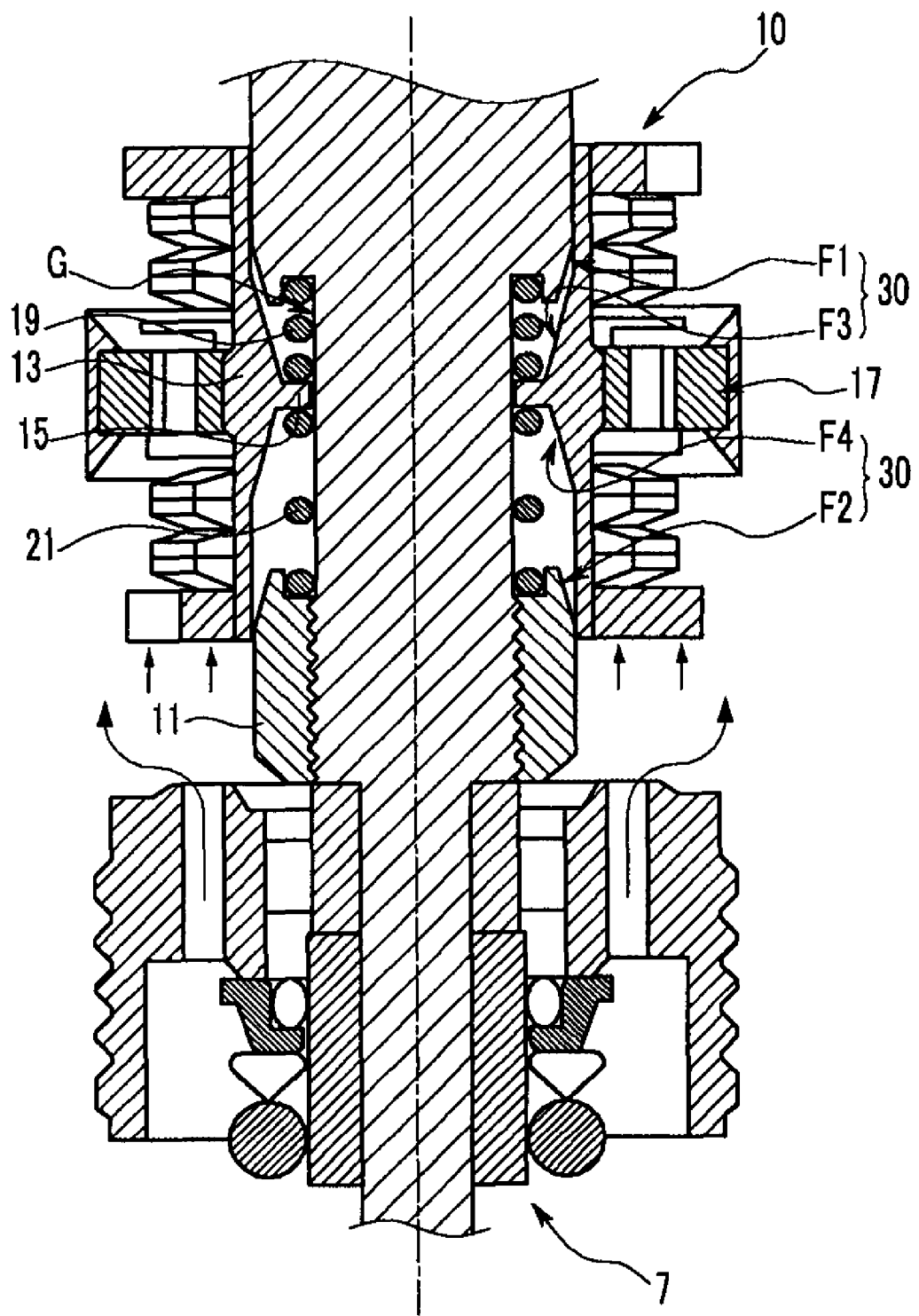
FIG. 4 is an expanded cross-sectional view of an exemplary amplitude sensitive valve unit that is applied to an amplitude sensitive damper apparatus according to the present invention.

As shown in FIG. 4, in the low amplitude condition, the upper or lower sensitive spring 19 or 21 is elastically deformed so that the amplitude sensitive valve 17 does not generate the damping force.

Figure 5:
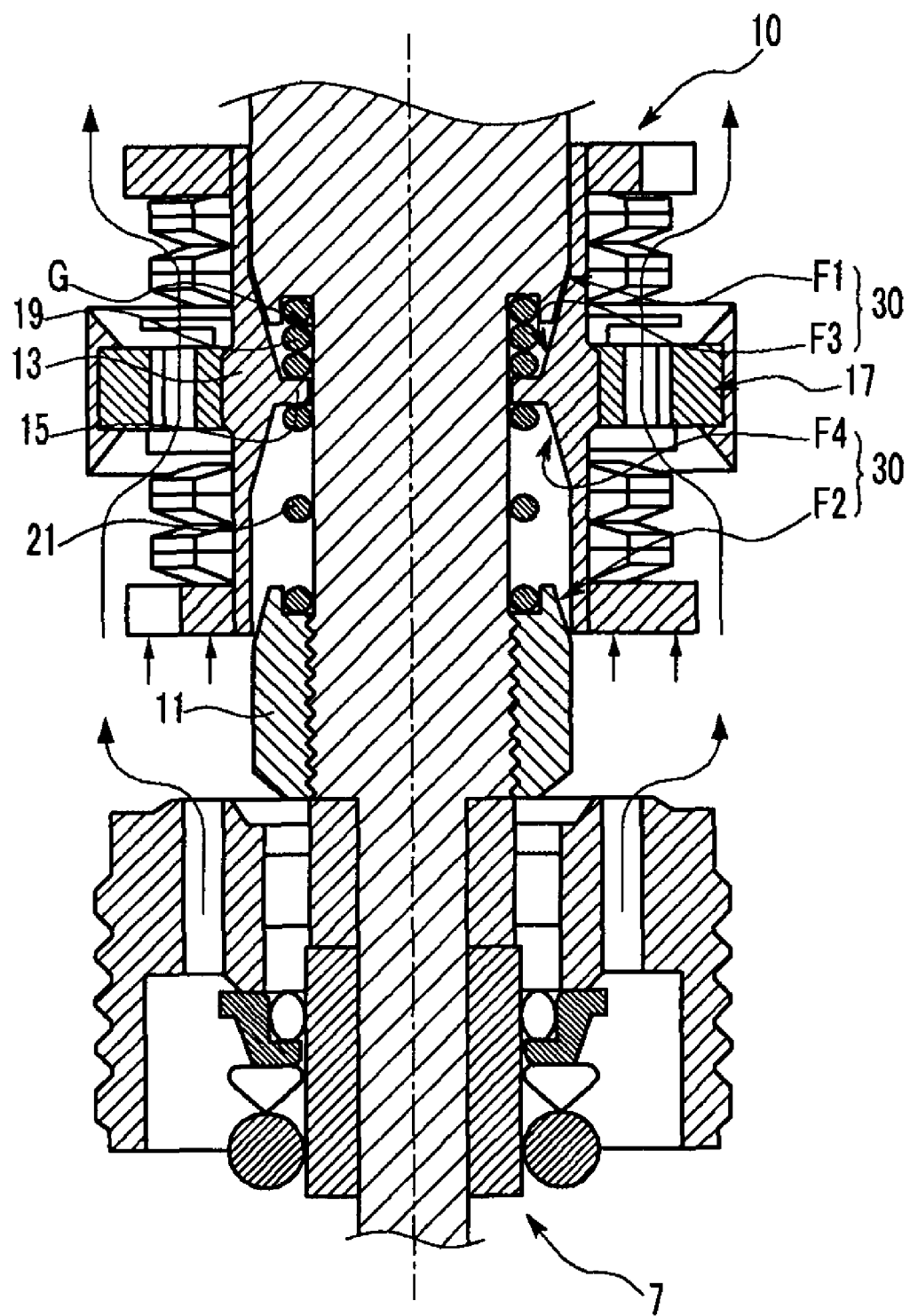
FIG. 5 is an expanded cross-sectional view of an exemplary amplitude sensitive valve unit that is applied to an amplitude sensitive damper apparatus according to the present invention.

Further, as shown in FIG. 5, in the high amplitude condition, when the upper or lower sensitive spring 19 or 21 is completely deformed, the spool member 13 and the amplitude sensitive valve 17 move to generate the damping force.

Then, the upper or lower corresponding slanted surface F3 or F4 of the spool member 13 respectively slidingly contacts the upper or lower slanted surface F1 or F2.

Accordingly, the above amplitude sensitive damper apparatus generates a soft or hard damping force in the low amplitude or in the high amplitude. That is, in the low amplitude, the low damping force is formed, and in the high amplitude, the high damping force is formed.

For convenience in explanation and accurate definition in the appended claims, the terms "upper", "lower", "outer", and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An amplitude sensitive damper apparatus provided with an amplitude sensitive valve unit to vary a damping force characteristic according to a wheel stroke size of a vehicle, the apparatus comprising:

a plug coupled to a piston rod to form a spring groove with the piston rod in a predetermined section wherein the spring groove is formed to be radially reduced with a predetermined depth along the piston rod;

a spool member configured and dimensioned to cover the spring groove and the plug and slidably coupled to the piston rod to move up and down along the piston rod, wherein the spool member includes a supporting portion that protrudes toward and is slidably engaged with the piston rod from a middle portion of an inner surface of the spool member in the spring groove;

upper and lower elastic members that are mounted inside the spring groove wherein the upper elastic member is disposed between an upper end of the spring groove and the supporting portion and the lower elastic member is disposed between a lower end of the spring groove and the supporting portion to support the supporting portion of the spool member upwards and downwards respectively along the piston rod; and an amplitude sensitive valve that is integrally mounted on an outer surface of the spool member to generate a damping force when the spool member is moving.

2. The amplitude sensitive valve unit of claim 1, wherein the amplitude sensitive valve includes an orifice.

3. The amplitude sensitive valve unit of claim 1, further comprising a stopper portion configured to restrict a vertical direction movement of the spool member within a predetermined distance.

4. The amplitude sensitive damper apparatus of claim 3, wherein the stopper portion includes:

upper and lower slanted surfaces that are respectively formed on an upper outer surface and a lower outer surface of the spring groove on a slant against the vertical movement direction of the spool member; and upper and lower corresponding slanted surfaces that are formed on a slant substantially corresponding to the upper and lower slanted surfaces of the spring groove from upper and lower side surfaces of the supporting portion to upper and lower end portions of the spool member respectively.

5. The amplitude sensitive damper apparatus of claim 1, wherein an upper end portion of the upper elastic member is supported by an upper side surface of the spring groove of the piston rod, and a lower end portion thereof is supported by an upper side surface of the supporting portion of the spool member.

6. The amplitude sensitive damper apparatus of claim 5, wherein the upper end portion of the upper elastic member is retained in a receiving groove formed in the upper side surface of the spring groove.

7. The amplitude sensitive damper apparatus of claim 1, wherein an upper end portion of the lower elastic member is supported by a lower side surface of the supporting portion of the spool member, and a lower end portion thereof is supported by a lower side surface of the spring groove.

8. The amplitude sensitive damper apparatus of claim 7, wherein the lower end portion of the lower elastic member is retained in a receiving groove formed in the lower side surface of the spring groove.

9. The amplitude sensitive damper apparatus of claim 1, wherein a piston valve is mounted on the piston rod, and the amplitude sensitive damper apparatus is mounted on upper or lower portion of the piston valve.

10. The amplitude sensitive damper apparatus of claim 9, wherein the plug is mounted on the upper portion of the piston valve.

11. The amplitude sensitive damper apparatus of claim 1, wherein the spring groove is formed between a groove formed on an outer surface of the piston rod and an end surface of the plug coupled to the piston rod.

12. The amplitude sensitive damper apparatus of claim 11, wherein the spool member is formed corresponding to an exterior circumference of the piston rod, and the spring groove is continuously formed corresponding to an interior circumference of the spool member.

13. The amplitude sensitive damper apparatus of claim 11, wherein the supporting portion is continuously formed along an interior circumference of the spool member.

14. The amplitude sensitive damper apparatus of claim 4, wherein the upper slanted surface is formed corresponding to a circumference of the piston rod, the lower slanted surface is formed corresponding to a circumference of the plug, and the upper corresponding slanted surface and the lower corresponding slanted surface are formed respectively corresponding to the upper slanted surface and the lower slanted surface.

* * * * *